United States Patent
Yoon et al.

(10) Patent No.: US 9,036,331 B2
(45) Date of Patent: May 19, 2015

(54) DIELECTRIC COMPOSITION AND CERAMIC ELECTRONIC COMPONENT INCLUDING THE SAME

(75) Inventors: Seok Hyun Yoon, Gyunggi-do (KR); Ji Young Park, Gyunggi-do (KR); Sun Ho Yoon, Gyunggi-do (KR); Sang Hoon Kwon, Gyunggi-do (KR); Chang Hoon Kim, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 412 days.

(21) Appl. No.: 13/362,820

(22) Filed: Jan. 31, 2012

(65) Prior Publication Data

US 2013/0083449 A1    Apr. 4, 2013

(30) Foreign Application Priority Data

Oct. 4, 2011   (KR) .................. 10-2011-0100772

(51) Int. Cl.
| | |
|---|---|
| H01G 4/06 | (2006.01) |
| C04B 35/00 | (2006.01) |
| C04B 35/468 | (2006.01) |
| H01G 4/30 | (2006.01) |
| H01G 4/12 | (2006.01) |
| H01G 4/008 | (2006.01) |

(52) U.S. Cl.
CPC .............. *C04B 35/4682* (2013.01); *H01G 4/30* (2013.01); *H01G 4/0085* (2013.01); *H01G 4/1227* (2013.01); *C04B 2235/3208* (2013.01); *C04B 2235/3215* (2013.01); *C04B 2235/3217* (2013.01); *C04B 2235/3224* (2013.01); *C04B 2235/3225* (2013.01); *C04B 2235/3229* (2013.01); *C04B 2235/3236* (2013.01); *C04B 2235/3239* (2013.01); *C04B 2235/3241* (2013.01); *C04B 2235/3262* (2013.01); *C04B 2235/3267* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/36* (2013.01); *C04B 2235/442* (2013.01); *C04B 2235/5445* (2013.01); *C04B 2235/6025* (2013.01); *C04B 2235/652* (2013.01); *C04B 2235/656* (2013.01); *C04B 2235/6582* (2013.01); *C04B 2235/663* (2013.01)

(58) Field of Classification Search
USPC ............... 361/321.1–321.5; 501/137–139
See application file for complete search history.

(56) References Cited

U.S. PATENT DOCUMENTS

| | | | |
|---|---|---|---|
| 7,072,170 B2 * | 7/2006 | Miyauchi et al. ........... | 361/321.2 |
| 2002/0098969 A1 * | 7/2002 | Nakamura et al. .......... | 501/137 |
| 2009/0310279 A1 * | 12/2009 | Sasabayashi et al. ...... | 361/321.4 |

FOREIGN PATENT DOCUMENTS

| | | |
|---|---|---|
| JP | 2002-164247 | 6/2002 |
| JP | 2008-230928 | 10/2008 |

*Primary Examiner* — Eric Thomas

(74) *Attorney, Agent, or Firm* — McDermott Will & Emery LLP

(57) ABSTRACT

There is provided a dielectric composition including: a base powder including $BaTiO_3$; a first accessory component including a content (x1) of 0.1 to 1.0 at % of an oxide or a carbonate including transition metals, based on 100 moles of the base powder; a second accessory component including a content (y) of 0.01 to 3.0 at % of oxide or carbonate including a fixed valence acceptor element, based on 100 moles of the base powder; a third accessory component including an oxide or a carbonate including a Ce element (content of z at %) and at least one rare earth element (content of w at %); and a fourth accessory component including a sintering aid, wherein $0.01 \leq z \leq x1+4y$ and $0.01 \leq z+w \leq x1+4y$ based on 100 moles of the base powder.

25 Claims, 1 Drawing Sheet

A-A'

DIELECTRIC COMPOSITION AND CERAMIC ELECTRONIC COMPONENT INCLUDING THE SAME

CROSS-REFERENCE TO RELATED APPLICATIONS

This application claims the priority of Korean Patent Application No. 10-2011-0100772 filed on Oct. 4, 2011, in the Korean Intellectual Property Office, the disclosure of which is incorporated herein by reference.

BACKGROUND OF THE INVENTION

1. Field of the Invention

The present invention relates to a dielectric composition and a ceramic electronic component including the same.

2. Description of the Related Art

Generally, electronic components using a ceramic material, such as a capacitor, an inductor, a piezoelectric element, a varistor, or a thermistor, include a ceramic element formed of a ceramic material, internal electrodes formed within the ceramic element, and external electrodes mounted on a surface of the ceramic element to be connected to the internal electrodes.

Among ceramic electronic components, a multilayer ceramic capacitor (MLCC) includes a plurality of laminated dielectric layers, internal electrodes disposed to face each other, having dielectric layers interposed therebetween, and external electrodes electrically connected to the internal electrodes.

The multilayer ceramic capacitor has been widely used as a component of mobile communications devices such as portable computers, PDAs, mobile phones, and the like, due to strengths such as miniaturization, high capacity, ease of mounting, and the like.

A multilayer ceramic capacitor is a chip type capacitor that is mounted on printed circuit boards within several types of electronic product, such as a mobile communications terminal, a notebook, a computer, and personal digital assistants, or the like, to serve to charge or discharge electricity and has various sizes and stacked forms, according to usage and capacity.

In addition, demand for a microminiaturized, supercapacitive multilayer ceramic capacitor has increased electronic products have been reduced in size. Therefore, an internal electrode and a dielectric layer need to be thin to allow for miniaturization, and a product in which a number of dielectrics are stacked has been produced for supercapacity.

However, when a dielectric layer is thin, the reliability and the high-temperature withstand voltage characteristics thereof may be degraded.

SUMMARY OF THE INVENTION

An aspect of the present invention provides a method for implementing a dielectric layer allowing for the same capacity as a dielectric layer of the related art without reducing the thickness thereof so as to secure reliability.

According to an aspect of the present invention, there is provided a dielectric composition, including: a base powder including $BaTiO_3$; a first accessory component including a content (x1) of 0.1 to 1.0 at % of an oxide or a carbonate including transition metals, based on 100 moles of the base powder; a second accessory component including a content (y) of 0.01 to 3.0 at % of an oxide or a carbonate including a fixed valence acceptor element, based on 100 moles of the base powder; a third accessory component including an oxide or a carbonate including a Ce element (content of z at %) and at least one rare earth element (content of w at %); and a fourth accessory component including a sintering aid, wherein $0.01 \leq z \leq x1+4y$ and $0.01 \leq z+w \leq x1+4y$ based on 100 moles of the base powder.

According to another aspect of the present invention, there is provided a dielectric composition, including: a base powder including $(Ba_{1-x}Ca_x)(Ti_{1-y}Zr_y)O_3$; a first accessory component including a content (x2) of 0.2 to 1.4 at % of an oxide or a carbonate including transition metals, based on 100 moles of base powder; a third accessory component including a content x2 of 0.2 to 1.4 at % of an oxide or a carbonate including a Ce element (content of z at %) and at least one rare earth element (content of w at %); and a fourth accessory component including a sintering aid, and $0.01 \leq z \leq 0.6$ and $0.01 \leq z+w \leq 4x2$ based on 100 moles of the base powder.

The content of the fourth accessory component may be 0.1 to 8.0 mol %, based on 100 moles of the base powder.

The sintering aid for the fourth accessory component may be an oxide or a carbonate of at least one of Si, Ba, Ca, and Al.

The sintering aid for the fourth accessory component may include a glass component including Si.

The transition metal of the first accessory component may be at least one selected from a group consisting of Mn, V, Cr, Fe, Ni, Co, Cu, and Zn.

The fixed valence acceptor element of the second accessory component may be at least one of Mg and Al.

The rare earth element of the third accessory component may be Y, Dy, Ho, Er, and Gd.

According to another aspect of the present invention, there is provided a ceramic electronic component, including: a ceramic element including a plurality of dielectric layers stacked therein; an internal electrode formed in the ceramic element and including a non-metal; and an external electrode formed on an outer surface of the ceramic element and electrically connected to the internal electrode, wherein the dielectric layer includes a base powder including $BaTiO_3$; a first accessory component including a content (x1) of 0.1 to 1.0 at % of an oxide or a carbonate including transition metals, based on 100 moles of the base powder; a second accessory component including a content y of 0.01 to 3.0 at % of an oxide or a carbonate including a fixed valence acceptor element, based on 100 moles of the base powder; a third accessory component including an oxide or a carbonate including a Ce element (content of z at %) and at least one rare earth element (content of w at %); and a fourth accessory component including a sintering aid, wherein $0.01 \leq z \leq x1+4y$ and $0.01 \leq z+w \leq x1+4y$ based on 100 moles of the base powder.

According to another aspect of the present invention, there is provided a ceramic electronic component, including: a ceramic element including a plurality of dielectric layers stacked therein; an internal electrode formed in the ceramic element and including a non-metal; and an external electrode formed on an outer surface of the ceramic element and electrically connected to the internal electrode, wherein the dielectric layer includes: a base powder including $(Ba_{1-x}Ca_x)(Ti_{1-y}Zr_y)O_3$; a first accessory component including a content x2 of 0.2 to 1.4 at % of an oxide or a carbonate including transition metals, based on 100 moles of base powder; a third accessory component including a content x2 of 0.2 to 1.4 at % of an oxide or a carbonate including a Ce element (content of z at %) and at least one rare earth element (content of w at %); and a fourth accessory component including a sintering aid, wherein $0.01 \leq z \leq 0.6$ and $0.01 \leq z+w \leq 4x2$ based on 100 moles of the base powder.

A thickness of each dielectric layer may be 0.1 to 10 μm.

The internal electrode may include Ni or an alloy of Ni.

The internal electrode may be alternately stacked with the dielectric layer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
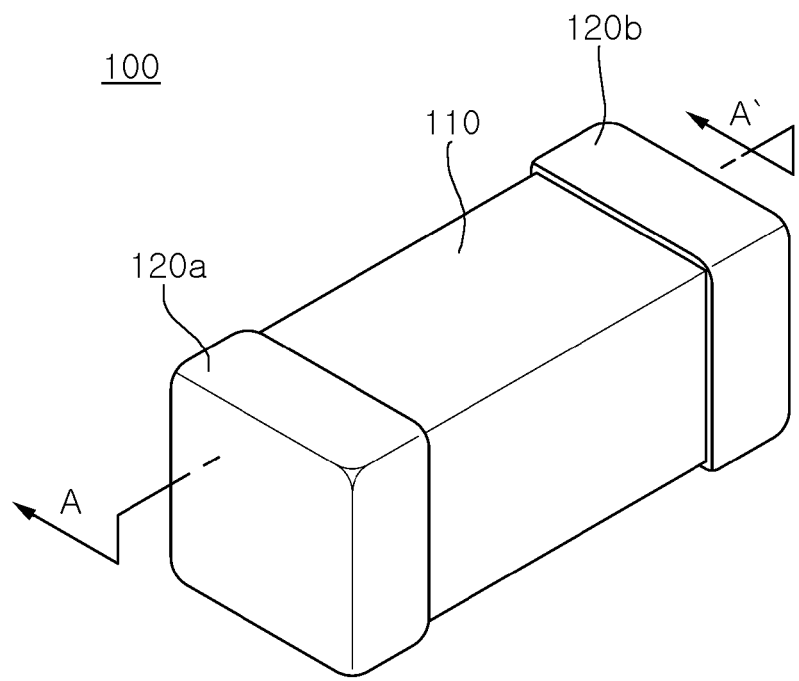
FIG. 1 is a perspective view schematically showing a multilayer ceramic capacitor according to an embodiment of the present invention.

Embodiments of the present invention will now be described in detail with reference to the accompanying drawings.

The embodiments of the present invention may be modified in many different forms and the scope of the invention should not be limited to the embodiments set forth herein.

Rather, these embodiments are provided so that this disclosure will be thorough and complete, and will fully convey the concept of the invention to those skilled in the art.

In the drawings, the shapes and dimensions may be exaggerated for clarity, and the same reference numerals will be used throughout to designate the same or like components.

In addition, like reference numerals denote parts performing similar functions and actions throughout the drawings.

In addition, unless explicitly described otherwise, "comprising" any components will be understood to imply the inclusion of other components but not the exclusion of any other components.

The present invention relates to a dielectric composition. An example of a ceramic electronic component including a dielectric composition according to an embodiment of the present invention may include a multilayer ceramic capacitor, an inductor, a piezoelectric element, a varistor, a chip resistor, a thermistor, or the like. A high-capacity base metal electrode (BME) multilayer ceramic capacitor according to one embodiment of the ceramic electronic component will be described below.

Figure 2:
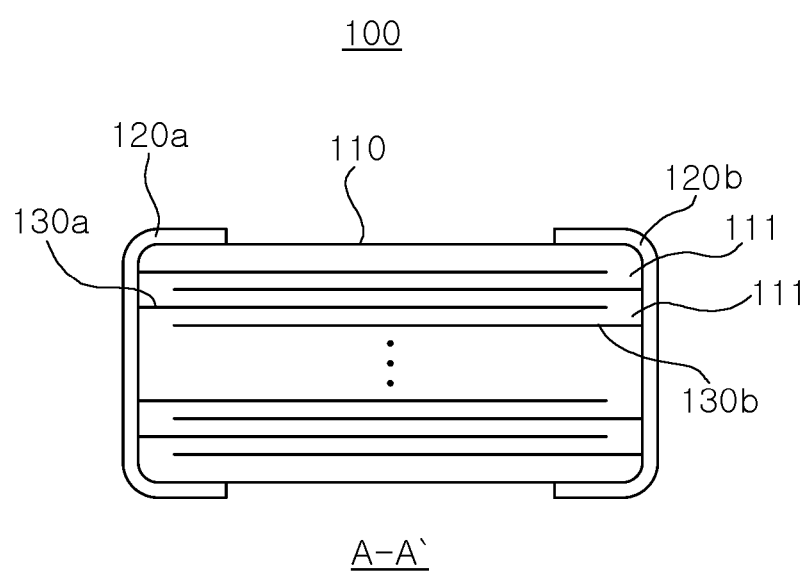
FIG. 2 is a cross-sectional view taken along the line A-A' of FIG. 1.

Referring to FIGS. 1 and 2, a multilayer ceramic capacitor 100 according to the embodiment of the present invention may include a multilayered ceramic element 110 in which a dielectric layer 111 and first and second internal electrodes 130a and 130b are alternately disposed. Both ends of the ceramic element 110 are provided with the first and second external electrodes 120a and 120b electrically connected with the first and second internal electrodes 130a and 130b, respectively, which are alternately disposed in the ceramic element 110.

A shape of the ceramic element 110 is not particularly limited but may have a rectangular parallelepiped shape. In addition, a dimension of the ceramic element 110 is not particularly limited and may be appropriately set according to a usage. For example, the dimension of the ceramic element 110 may be (0.6 to 5.6 mm)×(0.3 to 5.0 mm)×(0.3 to 1.9 mm).

A thickness of the dielectric layer 111 may be arbitrarily changed so as to meet a capacity design of a capacitor. In the embodiment of the present invention, the thickness of the dielectric layer 111 after firing may be 0.1 μm or more per one layer, in more detail, 0.1 to 10 μm. The reason is that an active layer having a too thin thickness has a small number of crystal grains present in a single layer, thereby having an adverse effect on reliability.

The first and second internal electrodes 130a and 130b may be stacked such that end faces thereof may be alternately exposed to surfaces of both opposite ends of the ceramic element 110. A capacitor circuit may be configured by forming the first and second external electrodes 120a and 120b on both ends of the ceramic element 110 and electrically connecting the first and second external electrodes to the exposed end faces of the first and second internal electrodes 130a and 130b alternately disposed.

As a conductive material contained in the first and second internal electrodes 130a and 130b, it is not particularly limited, but non-metals may be used since construction materials of the dielectric layer 111 need to have non-reduction.

As an example of the conductive material, Ni or a Ni alloy, as the non-metal, may be used. An example of a Ni alloy may include an alloy of at least one selected from a group consisting of Mn, Cr, Co, and Al, and a Ni. In this case, a content of Ni in the alloy may be 95 wt % or more.

The thickness of the first and second internal electrodes 130a and 130b may be appropriately determined according to the usage, or the like. For example, the thickness of the first and second internal electrodes 130a and 130b may be 0.1 to 5 μm, in more detail, 0.1 to 2.5 μm.

As the conductive material contained in the first and second external electrodes 120a and 120b, it is not particularly limited, but Ni, Cu, or an alloy thereof may be used. The thickness of the first and second external electrodes 120a and 120b may be appropriately determined according to the usage, or the like. For example, the thickness of the first and second external electrodes 120a and 120b may be, for example, about 10 to 50 μm.

The dielectric layer 111 configuring the ceramic element 110 may contain the non-reduction dielectric composition. The dielectric composition according to the embodiment of the present invention may include a base powder and the following first to fourth accessory components.

The dielectric composition may secure high permittivity and high-temperature reliability while maintaining high-temperature withstand voltage characteristics approximately equivalent to the existing dielectric compositions and may be fired under the reduction atmosphere of low temperature, for example, 1260° C. or less such that the internal electrode including Ni or a Ni alloy may be used.

These effects may implement equivalent capacity while allowing the thickness of the dielectrics to be thicker as compared with the case in which the existing compositions are applied and may be effectively applied to development of super-capacity MLCC having relatively thin dielectrics.

Hereinafter, each component of the dielectric compositions according to the embodiment of the present invention will be described in more detail.

a) Base Powder

As the base powder, a $BaTiO_3$-based dielectric powder may be used as a main component of the dielectrics. In some cases, as the base powder, $(Ba_{1-x}Ca_x)TiO_3$, $(Ba_{1-x}Ca_x)(Ti_{1-y}Ca_y)O_3$ (hereinafter, referred to as BCTZ), $(Ba_{1-x}Ca_x)(Ti_{1-y}Zr_y)O_3$ or $Ba(Ti_{1-y}Zr_y)O_3$, which are modified by partially bonding Ca, Zr, or the like, to $BaTiO_3$, may be used. In this case, an average particle size of the base powder may be 1.0 μm or less, but is not limited thereto.

b) First Accessory Component

An example of the first accessory component may include an oxide or a carbonate including transition metals. The transition metal oxide or carbonate serves to impart the non-reduction and reliability of the dielectric composition.

The transition metal may be selected from a group consisting of Mn, V, Cr, Fe, Ni, Co, Cu, and Zn, as a variable-valence acceptor element. The form of the transition metal oxide or carbonate is not particularly limited, but for example, $MnO_2$, $V_2O_5$, $MnCO_3$, or the like, may be used.

In this case, a content of the first accessory component capable of implementing the required non-reduction and reliability may be 0.1 to 1.0 at % (hereinafter, referred to as "x1") based on 100 moles of the base powder when the base powder is the X5R/X7R type dielectrics, which is $BaTiO_3$. Herein, at % represents a composition ratio of the number of atoms.

Meanwhile, the content of the first accessory component in the case in which the base powder is the dielectrics of Y5V type, which is BCTZ may be 0.2 to 1.4 at % (hereinafter, referred to as "x2") based on 100 moles of the base powder.

When the content of the first accessory component (x1 or x2) is below the range, the high-temperature withstand voltage characteristics may be poor, the first accessory component may be easily reduced at the firing of the reductive atmosphere, and it may be difficult to control the grain growth, such that the deterioration of resistance may easily occur.

In addition, when the content (x1 or x2) of the first accessory component exceeds the range, the high-temperature withstand voltage characteristics may be poor, a sintering temperature may rise, and the permittivity may be degraded, such that it may be difficult to obtain the required dielectric constant value.

c) Second Accessory Component

The second accessory component may include the oxide or the carbonate including a fixed valence acceptor element. The second accessory component may be omitted in the case in which the base powder is BCTZ.

The second accessory component may serve to implement the suppression of abnormal grain growth and the non-reduction under the firing of the reductive atmosphere. As the fixed valence acceptor element, Mg or Al may be used.

In this case, the content (hereinafter, referred to as "y") of the second accessory component in which the non-reduction may be implemented may be 0.01 to 3.0 at % based on 100 moles of the base powder. When the content y of the second accessory component exceeds 3.0 at %, the firing temperature may rise and the high-temperature withstand voltage characteristics may be poor.

d) Third Accessory Component

The third accessory component may be the oxide or the carbonate including Ce element and at least one rare earth element.

The rare earth element may serve to increase the reliability and may be at least one of Y, Dy, Ho, Er, Gd, or the like, but the rare earth element of the embodiment of the present invention is not limited thereto.

In addition, according to the embodiment of the present invention, the oxide or the carbonate including the rare earth element and Ce element serving as a donor so as to implement the required non-reduction may be used. In this case, the form of the oxide or the carbonate including the Ce element is not limited, but for example, $CeO_2$, $CeCO_3$, or the like, may be used.

In this case, the content (at %, hereinafter, referred to as "z") of the Ce element and the content (at %, referred to as "w") of the rare earth element of the third accessory component capable of implementing the required non-reduction and reliability may be changed according to what the component of the base powder is.

When the base powder is $BaTiO_3$, at % content (z) of the Ce element may be $0.01 \leq z \leq x1+4y$ and $0.01 \leq z+w \leq x1+4y$. When the base powder is BCTZ, at % content (z) of the Ce element may be $0.01 \leq z \leq 0.6$ and $0.01 \leq z+w \leq 4x2$.

When the content (z) and the content (w) of the third accessory component are less than the range, the high-temperature withstand voltage characteristics may be degraded, and the non-reducible characteristics may be degraded when the content (z) and the content (w) of the third accessory component exceed the range.

In particular, when the base powder is $BaTiO_3$, the case in which the second accessory component and the third accessory component are co-doped within the range may have improved reliability as compared with in the case in which the base powder includes only the first accessory component.

e) Fourth Accessory Component

The fourth accessory component, a sintering aid lowering the firing temperature and promoting the sintering, may include the oxide or the carbonate including at least one of Si, Ba, Ca, and Al. As another example, the fourth accessory component may include a glass type including Si element.

In this case, the content of the fourth accessory component may be 0.1 to 8.0 mol %, based on 100 moles of the base powder. If the content of the fourth accessory component is below 0.1 mol %, the firing temperature rises and thus, the sinterability may be degraded, and when the content of the fourth accessory component exceeds 8.0 mol %, the grain growth may be difficult to be controlled and the sinterability may be degraded.

Hereinafter, although the present invention is described through Examples and Comparative Examples, these are to help understanding of the present invention. However, the scope of the present invention is not limited to the following Examples.

EXAMPLE

The slurry was prepared by mixing the base powder and raw powder including the first to fourth accessory components with a dispersant and a binder using a zirconia ball as a mixing and dispersing media, and by using ethanol and toluene as a solvent, according to the composition and content described in Tables 1 and 3, and then, performing ball milling for about 20 hours.

In this case of X5R/X7R type dielectric material, as the base powder, the $BaTiO_3$ powder having a mean particle size of 170 nm may be used, and in the case of the Y5V type dielectric material, the BCTZ $((Ba_{1-x}Ca_x)(Ti_{1-y}Ca_y))$, x=0.05, y=0.17) power having the mean particle size of 400 nm was used.

The prepared slurry was molded into the ceramic sheet having a thickness of 3.5 μM and 10~13 μm using a small doctor blade type coater.

The molded ceramic sheet was printed with the Ni internal electrode. The top and bottom covers were manufactured by stacking the covering sheets each having the thickness of 10 to 13 μm to 25 layers, and a pressing bar was manufactured by pressing and stacking printed active sheets of 21 layers.

The pressing bar was cut into a chip having a size of 3.2 mm×1.6 mm using a cutter. The cut chip was plasticized for debinding and the X5R/X7R type MLCC was fired for about 2 hours at a temperature of about 1100 to 1250° C. under 0.1% $H_2$/99.9% $N_2$ of the reductive atmosphere ($H_2O/H_2/N_2$ atmosphere), and the Y5V type MLCC was fired for about 2 hours at a temperature of about 1100 to 1250° C. under 0.3% $H_2$/99.7% $N_2$ ($H_2O/H_2/N_2$ atmosphere) of the reductive atmosphere and then, was heat-treated for about 3 hours at about 1000° C. under $N_2$ atmosphere for reoxidation.

The MLCC chip having a size of 3.2 mm×1.6 mm of which the dielectric thickness is 2.0 μm or less and the number of dielectric layers is 20 layers was manufactured by completing the external electrode by performing a termination process and an electrode firing process on the fired chip using Cu paste.

[Evaluation]

The normal-temperature capacitance and the dielectric loss of the MLCC chip were measured using an LCR meter under the conditions of 1 kHz, AC 0.5 V/μm in the case of the X5R/X7R type MLCC and the conditions of 1 kHz, AC 0.3 V/μm in the case of the Y5V type MLCC. The permittivity of the MLCC chip dielectrics was calculated from the capacitance and the dielectric thickness, the area of the internal electrode, and the number of layers of the MLCC chip. Further, the resistance deterioration behavior, or the like, was evaluated according to the voltage step increase at DF and 150° C.

The normal-temperature insulating resistance was measured after 60 seconds in the state in which the samples are taken by 10 and DC 10 V/μm is applied. The temperature coefficient of capacitance (TCC) according to a temperature was measured in the temperature range of –55° C. to 125° C.

In a high-temperature IR boosting test, the resistance deterioration behavior was measured while increasing the voltage step by DC 10 V/μm at 150° C. and a resistance value was measured by 5 seconds, wherein the time of each step is 10 minutes. The high-temperature withstand voltage was derived from the high-temperature IR boosting test. When the high-temperature withstand voltage was measured by applying the voltage step of DC V/μm at 150° C. to the MLCC chip for 10 minutes after firing and continuously increasing the voltage step, the high-temperature withstand voltage indicates a voltage that withstands $10^5 \Omega$ or more, wherein the MLCC chip has the dielectrics of 20 layers having a thickness 2 μm or less.

The RC value is a product of a normal-temperature capacitance value measured at AC 0.5V/μm and 1 kHz and a insulating resistance value measured at DC 10 V/μm. Characteristics of a proto-type chip formed of the dielectrics described in Tables 1 and 3 were shown in Tables 2 and 4.

Table 1 shows Examples of the dielectric composition in the Y5V type MLCC in which the base powder is the BCTZ and Table 2 shows the characteristics of the proto-type chip corresponding to the composition of Examples.

TABLE 1

The number of mole of each additive based on 100 moles of base material BCTZ

| Example | First Accessory Component | | Third Accessory Component | | Fourth Accessory Component | | |
|---|---|---|---|---|---|---|---|
| | $MnO_2$ | $V_2O_5$ | $Dy_2O_3$ | $CeO_2$ | $BaCO_3$ | $Al_2O_3$ | $SiO_2$ |
| 1 | 0.40 | 0.08 | 0.40 | 0.00 | 0.40 | 0.15 | 1.00 |
| 2 | 0.40 | 0.08 | 0.30 | 0.20 | 0.40 | 0.15 | 1.00 |
| 3 | 0.40 | 0.08 | 0.20 | 0.40 | 0.40 | 0.15 | 1.00 |
| 4 | 0.40 | 0.08 | 0.10 | 0.60 | 0.40 | 0.15 | 1.00 |
| 5 | 0.40 | 0.08 | 0.00 | 0.80 | 0.40 | 0.15 | 1.00 |
| 6 | 0.40 | 0.08 | 0.00 | 0.00 | 0.40 | 0.15 | 1.00 |
| 7 | 0.40 | 0.08 | 0.15 | 0.10 | 0.40 | 0.15 | 1.00 |
| 8 | 0.40 | 0.08 | 0.60 | 0.40 | 0.40 | 0.15 | 1.00 |
| 9 | 0.40 | 0.08 | 0.90 | 0.60 | 0.40 | 0.15 | 1.00 |
| 10 | 0.10 | 0.05 | 0.30 | 0.20 | 0.40 | 0.15 | 1.00 |
| 11 | 0.20 | 0.08 | 0.30 | 0.20 | 0.40 | 0.15 | 1.00 |
| 12 | 0.80 | 0.20 | 0.30 | 0.20 | 0.40 | 0.15 | 1.00 |

<Examples of Dielectric Composition in Y5V Type MLCC in which Base Powder is BCTZ>

TABLE 2

Characteristics of prototype chip

| Example | Proper Sintering Temperature(° C.) | Permittivity | DF(%) | RC(WF) | TCC(%) (85° C.) | TCC(%) (125° C.) | High-Temperature Withstand voltage (V/mm) |
|---|---|---|---|---|---|---|---|
| 1 | 1210 | 8573 | 1.92 | 130680 | –61.0 | No | 50 |
| 2 | 1210 | 11425 | 2.12 | 124195 | –61.2 | No | 55 |
| 3 | 1210 | 12371 | 2.41 | 9288 | –61.1 | No | 40 |
| 4 | 1210 | 13123 | 3.17 | 530 | –63.0 | No | 25 |
| 5 | 1210 | 11208 | 2.35 | 111 | –62.5 | No | 10 |
| 6 | 1210 | 11425 | 2.12 | 100350 | –61.2 | No | 50 |
| 7 | 1210 | 11028 | 2.35 | 113256 | –60.4 | No | 55 |
| 8 | 1210 | 12085 | 2.48 | 8566 | –65.2 | No | 40 |
| 9 | 1210 | 8845 | 2.86 | 6333 | –62.2 | No | 20 |
| 10 | 1240 | 14128 | 2.96 | 10023 | –63.0 | No | 35 |
| 11 | 1210 | 12355 | 2.33 | 111454 | –64.0 | No | 50 |
| 12 | 1190 | 7745 | 2.05 | 98502 | –61.2 | No | 40 |

<Characteristics of Proto-Type Chip Using Examples of Dielectric Composition in Y5V Type MLCC in which Base Powder is BCTZ>

It could be appreciated from Examples 1 to 5 that as a ratio of Dy is reduced and a ratio of Ce is increased in the state in which at % of all the elements of the first accessory component is 0.56 ($MnO_2$: 0.4%+$V_2O_5$: 0.08%), and at % of all the elements (Dy+Ce) of the third accessory component is fixed at 0.8, the permittivity is increased.

On the other hand, the high-temperature withstand voltage shows a highest value as 55 V/μm in Example 2 ($Dy_2O_3$: 0.3 mol % (Dy: 0.6 at %)+$CeO_2$: 0.2 mol %). Then, the high-temperature withstand voltage is reduced after exceeding the concentration and is then sharply reduced to 25 V/μm and 10 V/μm in, for example, in Examples 4 and 5 when the concentration of $CeO_2$ is 0.6 mol % or more. The above phenomenon corresponds to the phenomenon that normal-temperature RC value is sharply reduced to 530 and 111 ΩF in Examples 4 and 5.

In addition, in the state in which the ratio of Dy:Ce is maintained as 3:1, as a content of Dy+Ce is increased as in Examples 6 to 9, the high-temperature withstand voltage shows a relatively highest value in Example 7 ($Dy_2O_3$: 0.15 mol % (Dy: 0.3 at %)+$CeO_2$: 0.1 mol %) and the high-temperature withstand voltage is reduced when exceeding the concentration and then, is sharply reduced when the concentration of $CeO_2$ is 0.6 mol % or more and at % of the third accessory component is four times higher than at % of the first accessory component as in Example 9.

In addition, it could be appreciated from Examples 10 to 12 and Example 2 that as the sum of Mn and V, the first accessory component, is increased, the normal-temperature RC value and the high-temperature withstand voltage are increased and then, when the value of the first accessory component in the amount of thereof is excessively increased as in Example 12, these characteristics are rather decreased, under the same conditions that $Dy_2O_3$ is 0.3 mol % and $CeO_2$ is 0.2 mol %.

Therefore, when at % amount of the first accessory component Mn and V is set to be x2 and at % amounts of the rare earth element and the Ce in the third accessory component are respectively set to be z and w, as compared with the BCTZ; the range of x2, z, and w in which the dielectric characteristic, the non-reduction, and the reliability are implemented, may be set to be $0.2 \leq x2 \leq 1.4$, $0.01 \leq z \leq 0.6$, and $0.01 \leq z+w \leq 4x2$.

Table 3 shows Examples of the dielectric composition in the X5R/X7R type MLCC in which the base powder is the $BaTiO_3$ and Table 4 shows proto-type chip characteristics corresponding to the composition of Examples.

TABLE 3

<Examples of Dielectric Composition in X5R/X7R Type MLCC in which the Base Powder is $BaTiO_3$>

| | The number of mole of each additive element based on 100 moles of base material $BaTiO_3$ | | | | | | | |
|---|---|---|---|---|---|---|---|---|
| | First Accessory Component | | Second Accessory Component | Third Accessory Component | | Fourth Accessory Component | | |
| Example | $MnO_2$ | $V_2O_5$ | $MgCO_3$ | $Dy_2O_3$ | $CeO_2$ | $BaCO_3$ | $Al_2O_3$ | $SiO_2$ |
| 13 | 0.10 | 0.10 | 1.00 | 0.50 | 0.00 | 1.20 | 0.20 | 1.25 |
| 14 | 0.10 | 0.10 | 1.00 | 0.40 | 0.20 | 1.20 | 0.20 | 1.25 |
| 15 | 0.10 | 0.10 | 1.00 | 0.30 | 0.40 | 1.20 | 0.20 | 1.25 |
| 16 | 0.10 | 0.10 | 1.00 | 0.20 | 0.60 | 1.20 | 0.20 | 1.25 |
| 17 | 0.10 | 0.10 | 1.00 | 0.10 | 0.80 | 1.20 | 0.20 | 1.25 |
| 18 | 0.10 | 0.10 | 1.00 | 0.00 | 1.00 | 1.20 | 0.20 | 1.25 |
| 19 | 0.10 | 0.10 | 1.00 | 0.00 | 0.00 | 1.20 | 0.20 | 1.25 |
| 20 | 0.10 | 0.10 | 1.00 | 0.03 | 0.04 | 1.20 | 0.20 | 1.25 |
| 21 | 0.10 | 0.10 | 1.00 | 0.60 | 0.80 | 1.20 | 0.20 | 1.25 |
| 22 | 0.10 | 0.10 | 1.00 | 1.20 | 1.60 | 1.20 | 0.20 | 1.25 |
| 23 | 0.10 | 0.10 | 1.00 | 1.35 | 1.80 | 1.20 | 0.20 | 1.25 |
| 24 | 0.10 | 0.10 | 0.00 | 0.00 | 0.00 | 1.20 | 0.20 | 1.25 |
| 25 | 0.10 | 0.10 | 0.00 | 0.15 | 0.20 | 1.20 | 0.20 | 1.25 |
| 26 | 0.10 | 0.10 | 0.50 | 0.60 | 0.80 | 1.20 | 0.20 | 1.25 |
| 27 | 0.10 | 0.10 | 0.50 | 0.75 | 1.00 | 1.20 | 0.20 | 1.25 |
| 28 | 0.10 | 0.10 | 2.00 | 2.40 | 3.20 | 1.20 | 0.20 | 1.25 |
| 29 | 0.10 | 0.10 | 2.00 | 2.55 | 3.40 | 1.20 | 0.20 | 1.25 |
| 30 | 0.10 | 0.10 | 3.00 | 3.60 | 4.80 | 1.20 | 0.20 | 1.25 |
| 31 | 0.10 | 0.10 | 3.00 | 3.75 | 5.00 | 1.20 | 0.20 | 1.25 |
| 32 | 0.00 | 0.00 | 1.00 | 0.30 | 0.40 | 1.20 | 0.20 | 1.25 |
| 33 | 0.00 | 0.05 | 1.00 | 0.30 | 0.40 | 1.20 | 0.20 | 1.25 |
| 34 | 0.30 | 0.15 | 1.00 | 0.30 | 0.40 | 1.20 | 0.20 | 1.25 |
| 35 | 0.50 | 0.25 | 1.00 | 0.30 | 0.40 | 1.20 | 0.20 | 1.25 |

TABLE 4

| | Characteristics of prototype chip | | | | | | |
|---|---|---|---|---|---|---|---|
| Example | Proper Sintering Temperature(° C.) | Permittivity | DF(%) | RC(WF) | TCC(%) (85° C.) | TCC(%) (125° C.) | High-Temperature Withstand voltage (V/mm) |
| 13 | 1160 | 3550 | 6.88 | 5263 | −9.5 | −25.5 | 65 |
| 14 | 1160 | 3845 | 6.55 | 5477 | −8.5 | −23.2 | 70 |
| 15 | 1160 | 4456 | 6.78 | 5102 | −8.0 | −21.6 | 65 |
| 16 | 1160 | 4611 | 7.02 | 3458 | −7.4 | −20.6 | 55 |
| 17 | 1160 | 4732 | 7.45 | 3223 | −7.1 | −19.5 | 50 |
| 18 | 1190 | 4691 | 8.60 | 3040 | −6.5 | −19.1 | 45 |
| 19 | 1160 | 3110 | 6.24 | 7730 | −9.5 | −26.5 | 35 |
| 20 | 1160 | 3450 | 6.22 | 5527 | −9.2 | −27.1 | 45 |
| 21 | 1160 | 4366 | 7.11 | 3512 | −9.6 | −28.5 | 50 |
| 22 | 1160 | 4652 | 7.14 | 2845 | −8.4 | −22.5 | 40 |
| 23 | 1190 | 5124 | 7.88 | 852 | −8.1 | −21.8 | 25 |
| 24 | 1160 | 3750 | 6.25 | 3250 | −5.9 | −19.5 | 50 |
| 25 | 1160 | 4253 | 6.87 | 640 | −7.8 | −22.5 | 10 |
| 26 | 1160 | 4128 | 6.44 | 3356 | −8.8 | −21.1 | 45 |
| 27 | 1160 | 4689 | 7.26 | 566 | −9.1 | −21.1 | 10 |

TABLE 4-continued

| | | Characteristics of prototype chip | | | | | |
|---|---|---|---|---|---|---|---|
| Example | Proper Sintering Temperature(° C.) | Permittivity | DF(%) | RC(WF) | TCC(%) (85° C.) | TCC(%) (125° C.) | High-Temperature Withstand voltage (V/mm) |
| 28 | 1190 | 3458 | 5.54 | 2846 | −7.4 | −22.3 | 40 |
| 29 | 1190 | 3556 | 5.60 | 452 | −9.0 | −22.3 | 5 |
| 30 | 1230 | 2789 | 4.51 | 2568 | −8.8 | −26.8 | 35 |
| 31 | 1230 | 2856 | 4.66 | 341 | −9.2 | −27.5 | 5 |
| 32 | 1160 | 4625 | 6.88 | 52 | −8.8 | −23.6 | 5 |
| 33 | 1160 | 4476 | 6.44 | 2102 | −8.2 | −21.1 | 30 |
| 34 | 1160 | 3325 | 5.41 | 2985 | −7.7 | −23.5 | 45 |
| 35 | 1160 | 2458 | 4.22 | 2510 | −7.8 | −20.6 | 35 |

<Characteristics of Proto-Type Chip Using Examples of Dielectric Composition in X5R/X7R Type MLCC in which Base Powder is $BaTiO_3$>

It could be appreciated from Examples 13 to 18 that the permittivity is increased as the ratio of $CeO_2$ that is the third accessory component is increased under the condition that at % of all the elements of the first accessory component is 0.3 ($MnO_2$: 0.1 mol %+$V_2O_5$: 0.1 mol %), the concentration of $MgCO_3$ that is the second accessory component is 1 mol % and the sum of the third accessory components is fixed to 1.0 at %.

On the other hand, the high-temperature withstand voltage shows the highest value as 70 V/μm in Example 14 ($Dy_2O_3$: 0.4 mol % (Dy: 0.6 at %)+$CeO_2$: 0.2 mol %) and tends to be reduced when exceeding the concentration. Therefore, when the ratio of Ce is appropriately increased at the third accessory component, it could be appreciated that the permittivity is increased while the characteristics of the high-temperature withstand voltage having a preferable level are increased.

In addition, in the state in which the ratio of Dy:Ce is maintained at 3:2, as the content of the Dy+Ce is increased as in Examples 19 to 23, the high-temperature withstand voltage shows the highest value as in Example 21 ($Dy_2O_3$ 0.6 mol % (Dy 1.2 at %)+$CeO_2$ 0.8 mol %) and is reduced when exceeding the concentration and then, considerably reduced to 25 v/μm in Example 23 ($Dy_2O_3$ 1.35 mol %+$CeO_2$ 1.8 mol %).

It could be appreciated that the non-reduction and the high-temperature withstand voltage characteristics are sharply deteriorated in the range that the concentration of the third accessory component Dy+Ce is the specific concentration or less. In addition, it could be appreciated that as the concentration of $MgCO_3$ is increased, the concentration of the third accessory component is increased.

That is, it could be appreciated from Examples 25, 27, 23, 29, and 31 that as the $MgCO_3$ that is the second accessory component is not included (Example 25) or is gradually increased to 0.5 mol % (Example 27), 1.0 mol % (Example 23), 2.0 mol % (Example 29), and 3.0 mol % (Example 31), the at % concentration of Dy+Ce that is the third accessory component is increased 0.5 at % (Example 25), 2.5 at % (Example 27), 4.5 at % (Example 23), 8.5 at % (Example 29), and 12.5 at % (Example 31), and the normal-temperature RC value and the high-temperature withstand voltage is sharply reduced.

In addition, it could be appreciated that when the content of the $MgCO_3$ that is the second accessory component is excessive as 3.0 mol % (Example 30), the firing temperature is increased and the permittivity and the high-temperature withstand voltage is poor.

Further, it could be appreciated from Examples 32 to 35 and 15 that when the second accessory component is 1.0 mol % of Mg and the third accessory component is 0.3 mol % of $Dy_2O_3$+$CeO_2$, the sum of Mn and V that is the first accessory component is increased, the normal temperature RC value and the high-temperature withstand voltage are very low (Example 32) and when the first accessory component is excessive as 1 at % or more as in Example 35, the permittivity and the high-temperature withstand voltage characteristics are degraded.

Therefore, when the at % amount of Mn and V that are the first accessory component is set to be x1 and the at % amount of Mg of the second accessory component is set to be y, the at % amount of Ce and the rare earth element in the third accessory component are each set to be z and w, the range of x1, y, z, and w in which the non-reduction and the reliability are implemented may be set to be $0.1 \leq x1 \leq 1$, $0.01 \leq y \leq 3.0$, $0.01 \leq z \leq x1+4y$, and $0.01 \leq z+w \leq x1+4y$.

Therefore, Examples 3, 15, and 16 configured by the rare earth element and Ce that are the third accessory component increases the permittivity to 30% or more while maintaining the high-temperature withstand voltage characteristics approximately equivalent to the case in which only the existing rare earth element is made of (Examples 1 and 13).

As set forth above, the embodiments of the present invention may provide the dielectric composition capable of implementing the capacity approximately equivalent to the dielectric composition having the existing dielectric layer, without allowing the thickness of the dielectric layer to be thin, so as to secure the reliability, and the ceramic electronic component including the same.

While the present invention has been shown and described in connection with the embodiments, it will be apparent to those skilled in the art that modifications and variations can be made without departing from the spirit and scope of the invention as defined by the appended claims.

What is claimed is:

1. A dielectric composition, comprising:
   a base powder including $BaTiO_3$;
   a first accessory component including a content (x1) of 0.1 to 1.0 at % of an oxide or a carbonate including transition metals, based on 100 moles of the base powder;
   a second accessory component including a content (y) of 0.01 to 3.0 at % of oxide or carbonate including a fixed valence acceptor element, based on 100 moles of the base powder;
   a third accessory component including an oxide or a carbonate including a Ce element (content of z at %) and at least one rare earth element (content of w at %); and
   a fourth accessory component including a sintering aid,
   wherein $0.01 \leq z \leq x1+4y$ and $0.01 \leq z+w \leq x1+4y$ based on 100 moles of the base powder, and wherein the rate earth element of the third accessory component is at least one of Y, Dy, Ho, Er, and Gd.

2. The dielectric composition of claim 1, wherein the content of the fourth accessory component is 0.1 to 8.0 mol %, based on 100 moles of the base powder.

3. The dielectric composition of claim 1, wherein the sintering aid for the fourth accessory component is oxide or carbonate including at least one of Si, Ba, Ca, and Al.

4. The dielectric composition of claim 1, wherein the sintering aid for the fourth accessory component includes a glass component including Si.

5. The dielectric composition of claim 1, wherein the transition metal of the first accessory component is at least one selected from a group consisting of Mn, V, Cr, Fe, Ni, Co, Cu, and Zn.

6. The dielectric composition of claim 1, wherein the fixed valence acceptor element of the second accessory component is at least one of Mg and Al.

7. A dielectric composition, comprising:
a base powder including $(Ba_{1-x}Ca_x)(Ti_{1-y}Zr_y)O_3$;
a first accessory component including a content (x2) of 0.2 to 1.4 at % of an oxide or a carbonate including transition metals, based on 100 moles of base powder;
a third accessory component including an oxide or a carbonate including a Ce element (content of z at %) and at least one rare earth element (content of w at %); and
a fourth accessory component including a sintering aid, wherein $0.01 \leq z \leq 0.6$ and $0.01 \leq z+w \leq 4x2$ based on 100 moles of the base powder, and
wherein the rare earth element of the third accessory component is at least one of Y, Dy, Ho, Er, and Gd.

8. The dielectric composition of claim 7, wherein the content of the fourth accessory component is 0.1 to 8.0 mol %, based on 100 moles of the base powder.

9. The dielectric composition of claim 7, wherein the sintering aid for the fourth accessory component is an oxide or a carbonate including at least one of Si, Ba, Ca, and Al.

10. The dielectric composition of claim 7, wherein the sintering aid for the fourth accessory component includes a glass component including Si.

11. The dielectric composition of claim 7, wherein the transition metal of the first accessory component is at least one selected from a group consisting of Mn, V, Cr, Fe, Ni, Co, Cu, and Zn.

12. A ceramic electronic component, comprising:
a ceramic element including a plurality of dielectric layers stacked therein;
an internal electrode formed in the ceramic element and including a non-metal; and
an external electrode formed on an outer surface of the ceramic element and electrically connected to the internal electrode,
wherein the dielectric layer includes a base powder including $BaTiO_3$; a first accessory component including a content (x1) of 0.1 to 1.0 at % of an oxide or a carbonate including transition metals, based on 100 moles of the base powder; a second accessory component including a content (y) of 0.01 to 3.0 at % of oxide or carbonate including a fixed valence acceptor element, based on 100 moles of the base powder; a third accessory component including an oxide or a carbonate including a Ce element (content of z at %) and at least one rare earth element (content of w at %); and a fourth accessory component including a sintering aid, wherein $0.01 \leq z \leq x1+4y$ and $0.01 \leq z+w \leq x1+4y$ based on 100 moles of the base powder, and
wherein the rare earth element of the third accessory component is at least one of Y, Dy, Ho, Er, and Gd.

13. The ceramic electronic component of claim 12, wherein the content of the fourth accessory component is 0.1 to 8.0 mol %, based on 100 moles of the base powder.

14. The ceramic electronic component of claim 12, wherein the sintering aid for the fourth accessory component is oxide or carbonate including at least one of Si, Ba, Ca, and Al.

15. The ceramic electronic component of claim 12, wherein the sintering aid for the fourth accessory component includes a glass component including Si.

16. The ceramic electronic component of claim 12, wherein the transition metal of the first accessory component is at least one selected from a group consisting of Mn, V, Cr, Fe, Ni, Co, Cu, and Zn.

17. The ceramic electronic component of claim 12, wherein the fixed valence acceptor element of the second accessory component is at least one of Mg and Al.

18. The ceramic electronic component of claim 12, wherein a thickness of each dielectric layer is 0.1 to 10 μm.

19. The ceramic electronic component of claim 12, wherein the internal electrode includes Ni or an alloy of Ni.

20. The ceramic electronic component of claim 12, wherein the internal electrode is alternately stacked with the dielectric layer.

21. A ceramic electronic component, comprising:
a ceramic element including a plurality of dielectric layers stacked therein;
an internal electrode formed in the ceramic element and including a non-metal; and
an external electrode formed on an outer surface of the ceramic element and electrically connected to the internal electrode,
wherein the dielectric layer includes: a base powder including $(Ba_{1-x}Ca_x)(Ti_{1-y}Zr_y)O_3$; a first accessory component including a content (x2) of 0.2 to 1.4 at % of an oxide or a carbonate including transition metals, based on 100 moles of base powder; a third accessory component including an oxide or a carbonate including a Ce element (content of z at %) and at least one rare earth element (content of w at %); and a fourth accessory component including a sintering aid, wherein $0.01 \leq z \leq 0.6$ and $0.01 \leq z+w \leq 4x2$ based on 100 moles of the base powder, and
wherein the rare earth element of the third accessory component is at least one of Y, Dy, Ho, Er, and Gd.

22. The ceramic electronic component of claim 21, wherein the content of the fourth accessory component is 0.1 to 8.0 mol %, based on 100 moles of the base powder.

23. The ceramic electronic component of claim 21, wherein the sintering aid for the fourth accessory component is oxide or carbonate including at least one of Si, Ba, Ca, and Al.

24. The ceramic electronic component of claim 21, wherein the sintering aid for the fourth accessory component includes a glass component including Si.

25. The ceramic electronic component of claim 21, wherein the transition metal of the first accessory component is at least one selected from a group consisting of Mn, V, Cr, Fe, Ni, Co, Cu, and Zn.

* * * * *